United States Patent [19]

Bettker, Jr. et al.

[11] 4,221,421
[45] Sep. 9, 1980

[54] MOVABLE VEHICLE PARTITION ASSEMBLY

[75] Inventors: Clyde Bettker, Jr., Selah, Wash.
[73] Assignee: Lawrence Snow, Yakima, Wash.
[21] Appl. No.: 939,287
[22] Filed: Sep. 5, 1978
[51] Int. Cl.² .............................................. B62D 33/04
[52] U.S. Cl. ................................... 296/24 B; 296/37.6
[58] Field of Search ................... 296/24 B, 24 R, 34, 296/39 R, 39 A, 37.1, 37.5, 37.6; 280/179 R; 98/6

[56] References Cited

U.S. PATENT DOCUMENTS

| | | | |
|---|---|---|---|
| 2,782,846 | 2/1957 | Bussard | 296/24 B |
| 3,057,284 | 10/1962 | Learmont | 98/6 |
| 3,345,955 | 10/1967 | Erickson | 280/179 R |
| 3,516,706 | 6/1970 | Bruce | 296/24 R |
| 4,049,311 | 9/1977 | Dietrich | 296/24 R |
| 4,080,906 | 3/1978 | Brown | 296/24 R |
| 4,087,125 | 5/1978 | Stephens | 296/24 B |

FOREIGN PATENT DOCUMENTS 772723  4/1957  United Kingdom .................. 296/24 B

*Primary Examiner*—John J. Love
*Assistant Examiner*—John A. Carroll
*Attorney, Agent, or Firm*—Wells, St. John & Roberts

[57] ABSTRACT

Independently movable rigid walls or barriers are mounted within a vehicle body, such as a truck or trailer. They can be located with respect to the vehicle body in a first position juxtaposed parallel to one wall, a second position parallel to and spaced from the wall, and a third position arranged at an angle to the wall. By so arranging selected panels, one can divide the vehicle body into two compartments both open to the rear of the vehicle body, where conventional access doors are typically provided. In this way, palletized loads of refrigerated or frozen products can be physically separated from palletized loads of "dry" or non-refrigerated products. Partial flexible curtains are used to seal the top edges of the panels with respect to the vehicle body. Pivoted panels are used to seal the bottom edges and to assist in holding the panels in place when the vehicle body is loaded. Where refrigeration is necessary, the cooled air is ducted to selected outlets along one side of the vehicle body so as to lead to the enclosed area. In this way, cooled air is contained within an area partially bounded by the panels so as to maintain the area at a temperature lower than that of the remainder of the vehicle body. The size of the cooled area may be changed each time the vehicle body is loaded.

7 Claims, 7 Drawing Figures

MOVABLE VEHICLE PARTITION ASSEMBLY

BACKGROUND OF THE INVENTION

This invention relates to vehicle bodies, such as trucks or trailers used for highway or city delivery of food products to retail outlets. Quite often, a vehicle is required to deliver a mixed load of refrigerated or frozen products plus non-refrigerated "dry" products. This is typically accomplished in several ways, none of which are entirely satisfactory. First, two vehicles might be used, neither being completely filled. Secondly, a movable transverse curtain or partition might be located within a truck to divide one end of the truck from the other and thereby permit separation of cooled products from that shipped at environmental temperatures. Thirdly, no partition might be used at all, and all products within the vehicle would then be cooled. This is detrimental to certain products which should be maintained at normal environmental temperatures.

This problem becomes particularly troublesome in making deliveries of grocery products to individual markets or stores. Mixed loads of frozen and dry products are extremely common, and deliveries to such outlets seldom involve a full load. Instead, partial loads are delivered sequentially to several stores or markets, each of which might require both dry and frozen products.

This problem has become compounded by the current practice of palletizing loads of grocery products for delivery to individual stores. Palletizing involves substantial savings in labor, but these savings are lost if additional handling of the loaded products is required by the manner in which it is transported. Palletizing makes it difficult to reach products that are located behind a pelletized load, and requires that the palletized loads be removed from the vehicle body in a sequence opposite to that in which they were loaded into it.

The present invention provides a flexible partition assembly adaptable to palletized loads, which provides rear access to both dry and frozen palletized loads maintained in physically separate compartments in the vehicle body. The partition assembly is versatile and readily adjusted to particular load conditions, including changes as the vehicle body is unloaded from one store or market to the next. It also can be rearranged for handling return loads which are either similar or dissimilar from that handled in the initial trip.

This versatility is accomplished by use of a series of movable panels. Each panel is upright and movably located within the vehicle body by suitable support assemblies. Each panel can be moved between a first position juxtaposed parallel to one wall of the vehicle body, a second position parallel to and spaced from said one wall, and a third position is which it is arranged at an angle to the wall. In this way, each panel can be stored when not needed, can form part of a center partition along the vehicle body interior, or can form an end partition as the front boundary of a partial enclosure within the vehicle body. By using a cooling system confined to one side of the partition, a part of the vehicle body can be refrigerated while the remainder of it is maintained at normal environmental temperatures. Both sides of the partition are accessible from the rear of the vehicle body, so that pallets can be removed by conventional machinery. The removal of dry products does not affect the arrangement or removal of frozen products. Mixed loads are easily loaded and unloaded in a preplanned sequence, making it easy to service the needs of several stores or markets in a single trip. No side loading or side access to the vehicle body is required.

DESCRIPTION OF THE PREFERRED EMBODIMENT

The partition assembly disclosed herein is designed for highway or urban use in delivering mixed loads of refrigerated and non-refrigerated products. Such loads are frequently encountered in the delivery of grocery items to stores and markets, as well as to the warehouses and distribution centers servicing such stores and markets.

The partition assembly is utilized within the vehicle body 10, which can be either the body of a truck, or a trailer. In either instance, principal access to the vehicle body for loading and unloading purposes is accomplished through the rear by means of a conventional door assembly. Rear loading and unloading of such a vehicle body substantially facilitates the use of palletized loads and mechanized handling techniques.

Figure 1:
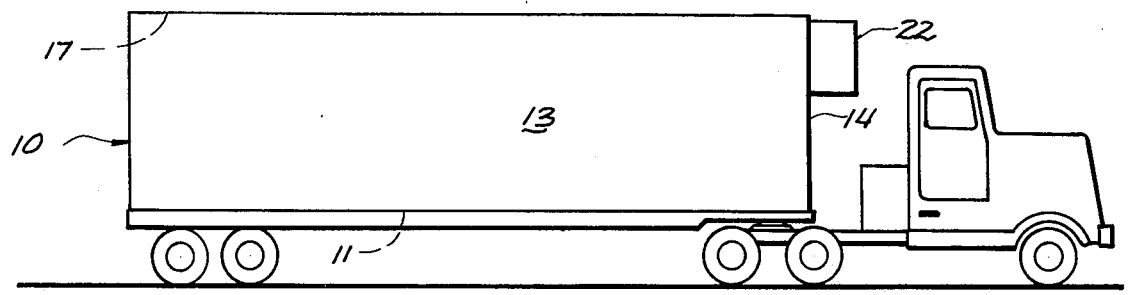
FIG. 1 is a side elevation view of a vehicle incorporating the invention.
Figure 2:
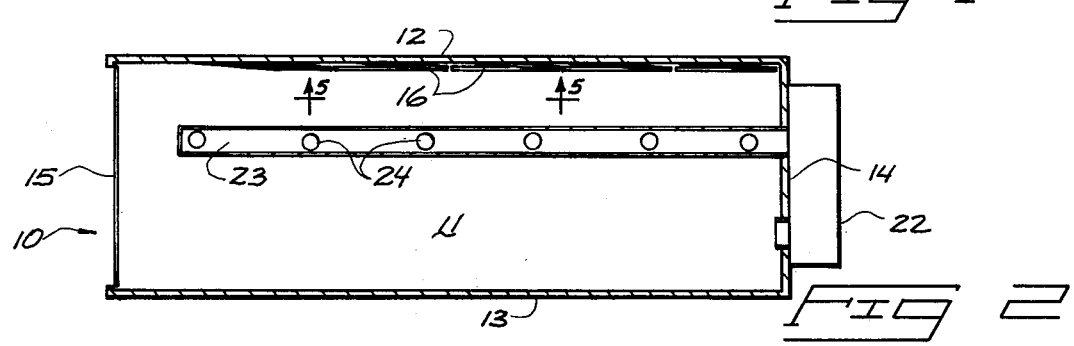
FIG. 2 is a plan view taken along line 2—2 in FIG. 1.
Figure 3:
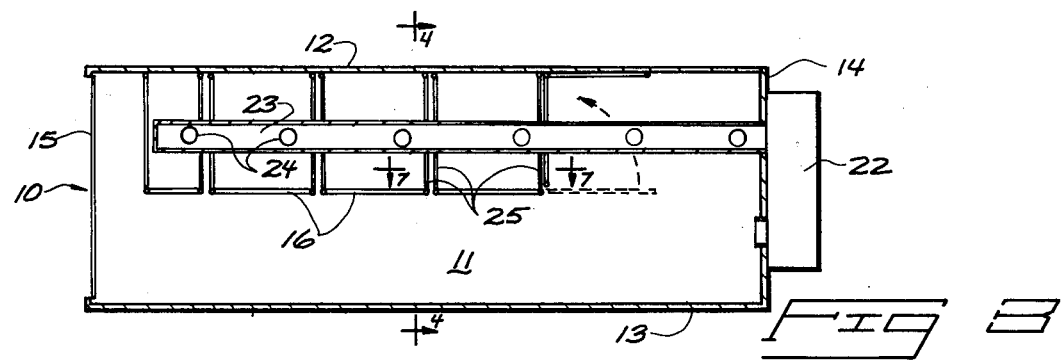
FIG. 3 is a plan view similar to FIG. 2, showing the partition assembly in an alternate arrangement.
Figure 4:
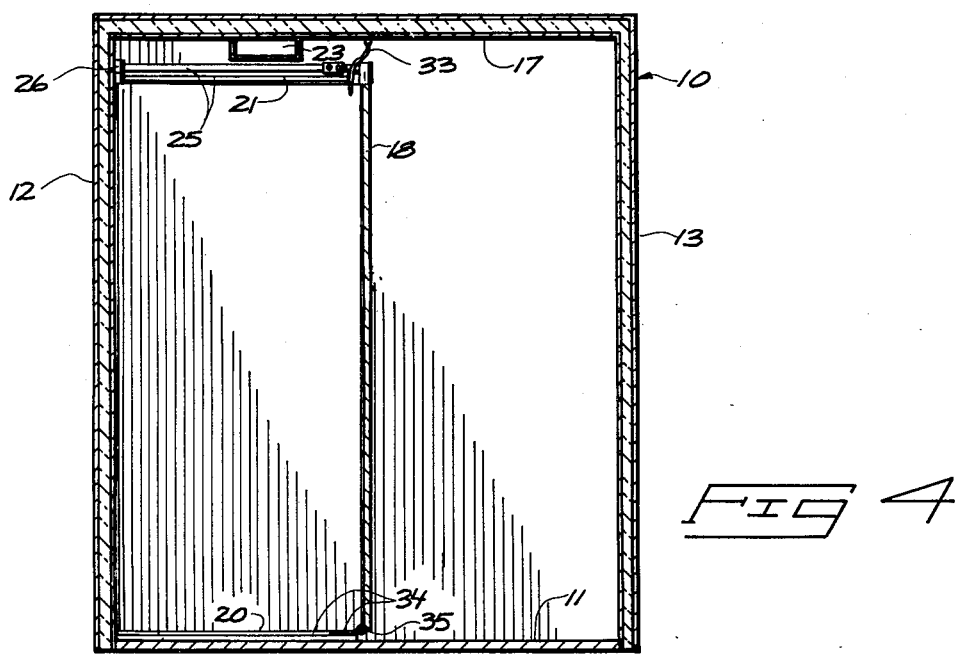
FIG. 4 is an enlarged sectional view taken along line 4—4 in FIG. 3.
Figure 5:
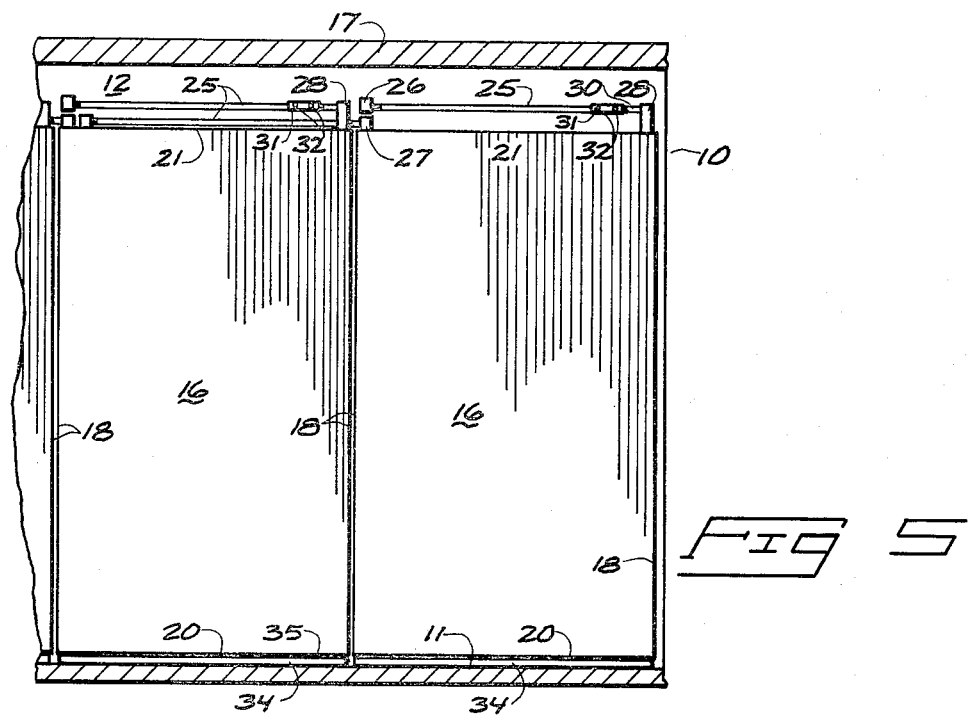
FIG. 5 is an enlarged fragmentary view taken along line 5—5 in FIG. 2.

The vehicle body schemmatically shown in FIGS. 1, 2 and 3 comprises a floor 11 bounded by two side walls 12, 13, a front end wall 14, and a rear end door assembly 15. The interior of the vehicle body is normally rectangular in shape, with the side walls 12, 13 spaced transversely across floor 11 and the ceiling structure 17. The end wall 14 at the front of the vehicle body is a solid stationary member, and typically mounts an external refrigeration unit shown at 22. The conventional end door assembly 15 at the rear of the vehicle body typically comprises a rolling vertical door or a pair of hinged doors pivoted at the respective sides of the vehicle body to permit full access across the width of it. With the vehicle backed to a loading dock, conventional fork lift trucks can be used within the vehicle body to load or unload palletized products.

The novel structure added to the conventional vehicle body comprises a plurality of rigid panels shown at 16. As illustrated in FIGS. 2 and 3, each panel can be stored, when not needed, in a first position juxtaposed parallel to the side wall 12. With the panels 16 in this position, (FIG. 2), the entire interior of the vehicle body 10 can be used for loading, transporting or unloading of palletized loads arranged about the floor 11. In this case, the entire load within the body 10 would be either refrigerated or non-refrigerated.

When a mixed load of refrigerated and non-refrigerated products is to be transported, the panels 16 are rearranged in a preselected pattern such as that shown in FIG. 3. As will be evident, the panels can be arranged in many different patterns, depending upon specific load requirements.

When used to subdivide the vehicle body interior, one or more panels 16 leading forwardly from the rear of the vehicle body are arranged in a position parallel to and spaced from the side walls 12. The partial enclosure is completed by one of the panels 16 arranged in a position at an angle to the side wall 12. As shown, this is a perpendicular angle connecting side wall 12 to the spaced parallel panels 16. Cooled air can then be contained within the area partially encompassed by the panels 16. Rear access is readily available to both sides of the center panels 16, permitting one to load or unload both refrigerated and non-refrigerated products in any desired pattern.

Referring now to the details shown in FIGS. 4 through 7, each rigid panel 16 is formed from a solid sheet of material. As an example, plywood panels might be used, or panels made from particleboard, or insulating foam with protective structural skin materials at each side. The thickness of panel 16 should be maintained at a minimum so as to not substantially reduce the interior volume of the vehicle body 10. Each panel 16, which is maintained in a vertical orientation, has a pair of transversely spaced side edges 18, a perpendicular horizontal bottom edge 20 and a horizontal top edge 21. The height of each panel 16 is substantially the floor to ceiling height within the vehicle body 10, although some clearance is provided at both the top and bottom ends of each panel 16 to facilitate its movement. The width of each panel 16 is preferably about one half the width between the interior side walls 12, 13, which permits the panel 16 to divide the vehicle body 10 into two compartments, each about one half the full width of the vehicle body 10.

When use of a refrigeration unit 22 is desired, it is preferable to provide a duct 23 leading from the unit 22 along the side wall 12 at a location adjacent to the ceiling 17. Duct 23 is provided with a series of longitudinally spaced outlets 24 which can be selectively opened or closed to direct cool air to the partially enclosed area along the vehicle body 10. In those instances where the majority of a load is refrigerated or frozen, a similar outlet 24 at the front end wall 14 can be used to direct cold air to the area outside the enclosure formed by the panel 16.

The panel 16 can be movably supported within the vehicle body 10 by many different mechanical arrangements. The illustrated apparatus includes a pair of support arms 25 pivotally arranged across the top edge 21 of each panel 16. The two support arms 25 are equal in length between their pivot axes on a panel 16 and side wall 12. One end of each support arm 25 is pivotally connected to side wall 12 by means of fixed pivot brackets 26 adjacent to the ceiling 17. The opposite end of each support arm 25 is pivotally connected to either a rear pivot bracket 17 or a front pivot bracket 28 on the panel 16. The pivot axes of the brackets 26, 27 and 28 are parallel to one another. The side wall 12, panel 16, and support arms 25 together form a parallelogram arrangement by which the panel 16 is maintained parallel to side wall 12 through the range of pivotal movement provided by its connection to the support arms 25.

Figure 6:
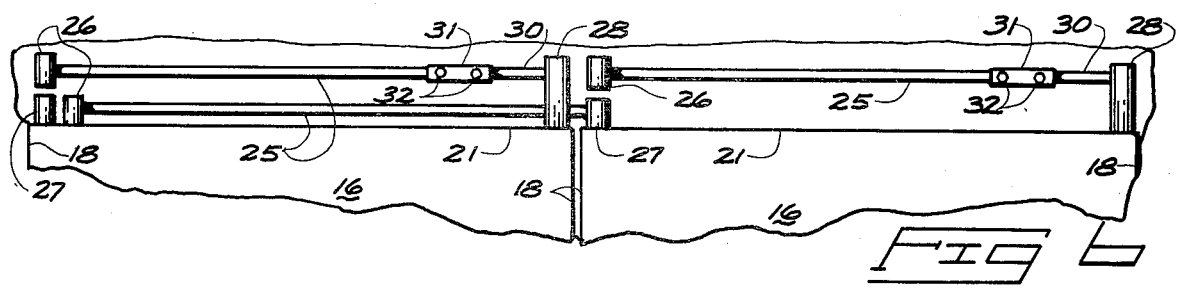
FIG. 6 is an enlarged fragmentary view taken across the top of FIG. 5.
Figure 7:
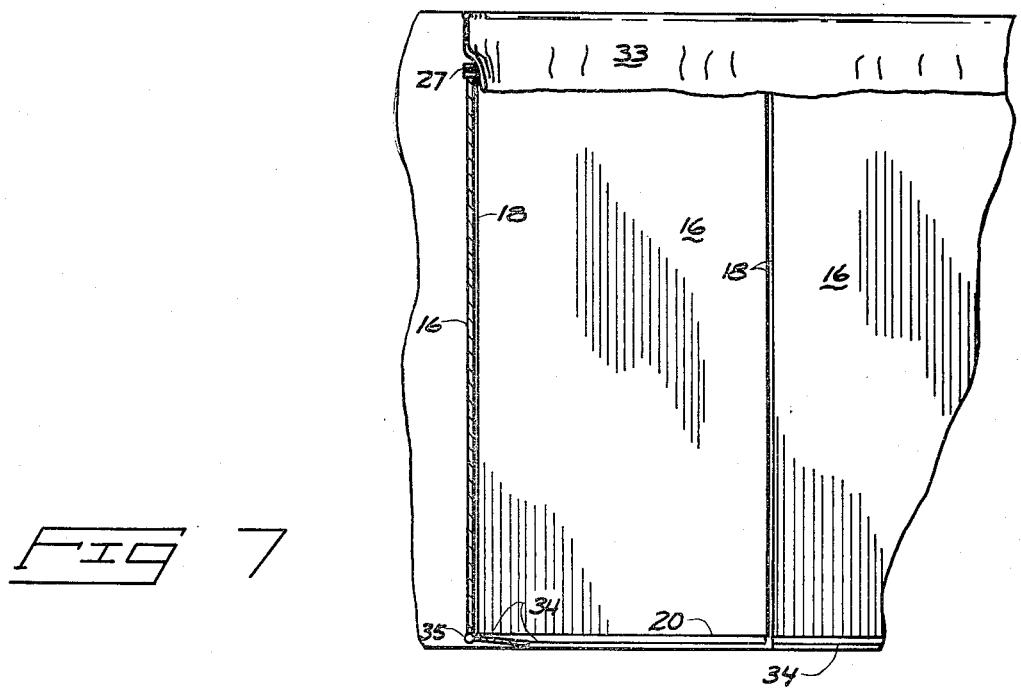
FIG. 7 is an enlarged fragmentary sectional view taken along line 7—7 in FIG. 3.

In order to permit arrangement of each panel 16 in a position perpendicular to the side wall 12, a releasable connection is provided at the front support arm 25 for each panel 16. As shown in FIG. 6, this releasable connection might comprise a stub arm 30 pivotally connected to the front pivot bracket 28, and selectively encircled by a longitudinally movable collar 31 on the aligned arm 25. The collar 31 encircles the abutting ends of the stub 30 and arm 25 and is held in place by blocking pins 32. By moving the collar 31 toward the pivot bracket 26, stub 30 can be freed from connection to the arm 25, which then permits the panel 16 to be pivoted about the axis of the rear pivot bracket 27. By freeing the front end of each panel 16, selected panels can be pivoted from the position along the center of the vehicle body 10 to a transverse position extending between the center of the vehicle body and the side wall 12.

The arrangement of the panels 16 will depend upon the size and nature of a particular load. Any of the full width panels 16 can be pivoted to enclose the front end of the area bounded partially by the panels 16. The open unobstructed area forward of the last panel 16 is then available for reception of palletized loads together with the remaining portion of the vehicle body to the side of the panels.

A flexible seal can be provided about the upper edges of panel 16 by partial refrigerator curtains 33 which are permanently mounted to ceiling 17 along the center line of the vehicle body 10 and transversely between the center line and side wall 12 at each of the perpendicular positions of the respective panels 16. The curtains 33 are of conventional refrigerator curtain material. The curtains 33 should be of a vertical height sufficient to overlap the top edge 21 of each panel 16. After the panels 16 have been arranged about the interior of the vehicle body 10, flexible curtains 33 should be placed within the refrigerated area so as to best prevent escape of cooled air across the top of the panel 16.

As shown, each panel 16 mounts a full width rectangular plate 34 across its bottom edge 20. Plate 34 is preferably of thin metal, and is connected to the panel 16 by a transverse hinge 35 having an axis parallel to bottom edge 20 and located closely adjacent to it. Plate 34 is spring-biased through an over-center arrangement or by detents to be stable at a first position adjacent to the panel 16 or vertical, and a second position adjacent to the floor 11, or horizontal. The vertical position of plate 34 is its storage position during non-use of panel 16. The horizontal position is its position when the panel 16 is being used to enclose a portion of the behicle body 10. When a load is placed adjacent to the panel 16, it will rest on plate 34. The weight of the load then serves to anchor the panel 16 in its intended position during use of the vehicle.

It is important to note that the partitions 16 must be solid and impermeable to movement of air so as to contain cooled air to one side of the panel. A flexible curtain or panel would be inadequate to restrain normal shifting of the load during transport use of the vehicle.

As shown, the rearmost panel 16 might be less wide than the remainder of the panels. This provides access at the end door assembly 15. In order to contain refrigerated air at the rear of the refrigerated space, a conventional half width refrigeration curtain (not shown) might be mounted across the ceiling 17 by a track assembly that supports the curtain for movement longitudinally along the vehicle body 10. This permits the refrigeration curtain to be moved forward against the load as the load is depleted by deliveries.

While not shown in the drawings, it is to be understood that conventional load locks are utilized within the vehicle body 10 to prevent movement of the pallets or load during use of the vehicle.

It is to be understood that this partition assembly is not limited to use in vehicle bodies having mechanical refrigeration units. When desired the partitions can be used in nonrefrigerated vehicle bodies utilizing dry ice or other cooling substances to maintain a temperature differential in one part of the vehicle body with respect to its remainder.

In use, panels 16 are arranged along the center of the floor 11 to encompass the projected size of a particular load. In most instances, the volume of frozen or refrigerated product will be less than the volume of the dry product, although this proportion can be reversed. After proper placement of the panels 16, with curtains 33 in an overlapping position across their top edges 21 and plate 34 pivoted to a horizontal position across their bottom edges 20, the vehicle body 10 can be loaded by conventional mechanized procedures through the rear end door assembly 15. By enabling the user of the vehicle to handle mixed loads of refrigerated and nonrefrigerated products simultaneously, substantial labor savings are available. As the load is depleted by subsequent deliveries to stores or markets, the rear refrigeration curtain can be moved rearwardly and selected duct outlets 24 can be opened or closed to continue effective separation of the refrigerated and nonrefrigerated compartments. It is not essential that the ratio of refrigerated product to nonrefrigerated product be maintained at an even ratio as the vehicle is unloaded. After the entire load has been delivered, a return load of either refrigerated products, nonrefrigerated products or a mixed load of different proportions can be readily handled in the vehicle, again increasing vehicle efficiency and reducing labor expenses.

Obviously, changes can be made in the specific structural features illustrated herein by way of example. For these reasons, the following claims are intended as definitions of the invention as disclosed by me.

Having described my invention, I claim:

1. In an enclosed vehicle body having a floor, a ceiling, a pair of transversely spaced side walls, an end wall across one end of the vehicle body, and a full width end door assembly across its remaining end;
    a plurality of upright rigid panels of impervious solid material, each panel having a height extending substantially from the floor to the ceiling of the vehicle body;
    individual support means connected between the interior of the vehicle body and each panel mounting the individual panels for movement relative to the vehicle body between a first position juxtaposed parallel to one wall and a second position arranged either parallel to and spaced from said longitudinal wall or at an angle to one said wall for arranging selected panels within the boundaries of the vehicle body to form an upright partition leading inward from the end door assembly to one wall of the vehicle body and subdividing the interior of the vehicle body into two compartments;
    means for modifying the environmental temperature in one compartment relative to the environmental temperature in the other compartment.

2. The apparatus as set out in claim 1 wherein each of said solid panels is rectangular and has a width equal to one half the horizontal separation between the side walls of the vehicle body.

3. The apparatus set out in claim 1 wherein said support means comprises:
    a pair of rigid arms arranged parallel to one another, the arms being of equal length and each arm having one arm pivotally connected to the vehicle body and its remaining end pivotally connected to a panel about parallel spaced axes.

4. The apparatus set out in claim 1 wherein said support means comprises:
    a pair of rigid arms arranged parallel to one another, the arms being of equal length and each arm having one arm pivotally connected to the vehicle body and its remaining end pivotally connected to a panel about parallel spaced axes; and
    a releasable connection interposed between one of said rigid arms and each panel.

5. The apparatus set out in claim 1 further comprising:
    refrigeration curtain means suspended from the ceiling of the vehicle body for overlapping and sealing the upper edges of the panels in their second positions.

6. The apparatus set out in claim 1, further comprising:
    hinged plate means, including a full width plate pivotally mounted to the lower edge of each panel for motion about an axis parallel to said lower edge between a storage position folded against the panel and a sealing position extending horizontally outward from the panel, said plate being adapted to be engaged between the floor of the vehicle body and a load placed thereon at a location directly adjacent to the panel to which it is pivotally mounted.

7. An apparatus as set out in claim 1, wherein said last-named means comprises:
    a refrigeration unit mounted to said vehicle body;
    and a duct within the vehicle body, said duct leading from the refrigeration unit along one side wall thereof having a series of longitudinally spaced controllable outlets for directing cooled air from said refrigeration unit into said one compartment.

* * * * *